United States Patent [19]

Cournoyer et al.

[11] Patent Number: 4,520,976
[45] Date of Patent: Jun. 4, 1985

[54] CABLE BUSHING

[75] Inventors: Bernard T. Cournoyer, Holden; Norman A. Hedstrom, Worcester, both of Mass.

[73] Assignee: Wright Line Inc., Worcester, Mass.

[21] Appl. No.: 361,640

[22] Filed: Mar. 25, 1982

[51] Int. Cl.³ .............................................. F16L 5/00
[52] U.S. Cl. .................................. 248/56; 174/153 G
[58] Field of Search .................. 248/56, 73, 27.1; 285/162, DIG. 22; 403/238, 230, 167; 174/65 G, 153 G, 152 G, 96; 52/221; 126/317

[56] References Cited

U.S. PATENT DOCUMENTS

| | | | |
|---|---|---|---|
| 2,702,722 | 2/1955 | Rappl | 248/56 |
| 3,221,572 | 12/1965 | Swick | 285/162 |
| 3,229,939 | 1/1966 | Hubbard | 248/27.1 |
| 3,322,442 | 5/1967 | Flachbarth | 52/221 |
| 3,592,956 | 7/1971 | Fork | 174/96 |
| 3,631,738 | 1/1972 | Harper | 285/162 |
| 3,749,818 | 7/1973 | Jemison | 248/56 |
| 4,074,945 | 2/1978 | Kraus et al. | 285/162 |
| 4,244,484 | 1/1981 | Guritz et al. | 52/221 |
| 4,282,627 | 8/1981 | Downine | 285/162 |
| 4,293,151 | 10/1981 | Mancel | 285/162 |

Primary Examiner—William H. Schultz
Assistant Examiner—Ramon O. Ramirez
Attorney, Agent, or Firm—Milton E. Gilbert; Gary E. Ross

[57] ABSTRACT

A new and improved cable bushing including a frame portion, and a detachable filler portion connected to the frame portion, is herein disclosed and claimed. The filler portion includes at least one hinged flap movable between a first position in which the flap is remote from the interior of the frame portion, and a second position in which the flap is disclosed substantially within the frame portion so as to permit a cable to be received therethrough while the frame portion occupies an opening within a unit of office furniture or partition. The filler portion with its flap in its first position has a substantially flat top surface which may be disposed in a coplanar relation with the top or exposed surface of the structure in which the bushing is mounted.

15 Claims, 12 Drawing Figures

CABLE BUSHING

BACKGROUND OF THE INVENTION

1. Field of the Invention

The invention relates to cable fixtures and is directed more particularly to a cable bushing for supporting a cable member passing through office furniture, partitions and the like.

2. Description of the Prior Act

It is commonplace, in order to pass an electrical cable through a partition or wall, to cut a hole in the partition and pass the cable therethrough. In many instances, however, the partition is of metal and such a hole presents sharp edges which tend to cut and/or wear away the outer layers of the cable. To prevent damage to the cable, there have been provided cable bushings which, however, have required cutting with a sharp instrument to allow passage of a cable therethrough.

Another design for a cable bushing is taught in the commonly assigned patent application filed Apr. 11, 1980, Ser. No. 139,286. In that design a filler portion of the bushing is extendable and compressible via a plurality of accordion folds or pleats so as to be able to substantially fill the space between the cable and the surrounding bushing. Though advantageous in other respects, that design lacked a flat or planar top surface. A planar top surface is highly desirable for a cable bushing, especially where the cable bushing is used in the top surface of a desk, writing table or work station.

SUMMARY OF THE INVENTION

An object of the present invention is to provide a cable bushing adapted to occupy an opening in a structure and to receive a cable therethrough.

A further object of the invention is to provide a cable bushing adapted for use without cutting of the bushing.

A still further object of the invention is to provide a cable bushing as above described having facility for filling at least a portion of the space between the cable and the surrounding bushing.

Another object of the invention is to provide a cable bushing having a filler portion with a top surface which substantially fills the space around the cable disposed therein, is substantially planar and is substantially parallel and flush with the outer or exposed surface (e.g., desk top) of the structure in which the bushing is disposed.

Yet a further object of the invention is to provide a cable bushing capable of receiving a cable therethrough, and capable of completely filling the opening in the structure in the absence of the cable.

With the above and other objects in view, as will hereinafter appear, a feature of the present invention is the provision of a cable bushing including a frame portion, and a detachable filler portion connected to the frame portion, the filler portion having at least one hinged flap movable between a first position in which the flap is remote from the interior of the frame portion and a second position in which the flap is disposed substantially within the frame portion, the frame portion being adapted to occupy an opening in a unit of office furniture or partition structure and being further adapted to receive a cable therethrough, said cable being disposable to extend through the filler portion within the opening provided when the flap is in its second position. The filler portion with the flap in its first position is substantially a planar sheet which is disposable in a substantially parallel and flush fashion with respect to the top surface of the structure in which the bushing is mounted.

The above and other features of the invention, including various novel details of construction and combination of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent. Like features in the drawings are designated by like reference numerals.

DESCRIPTION OF THE PREFERRED EMBODIMENT

Figure 1:
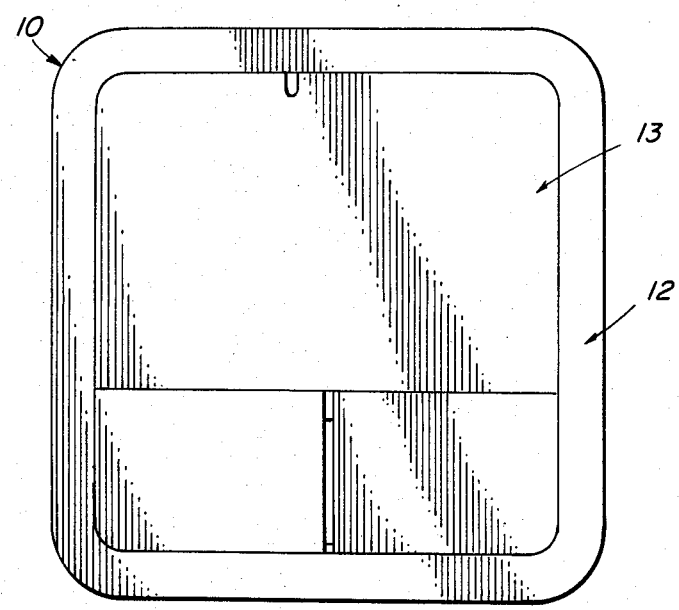
FIG. 1 is a top plan of a cable bushing illustrative of an embodiment of the invention.
Figure 2:
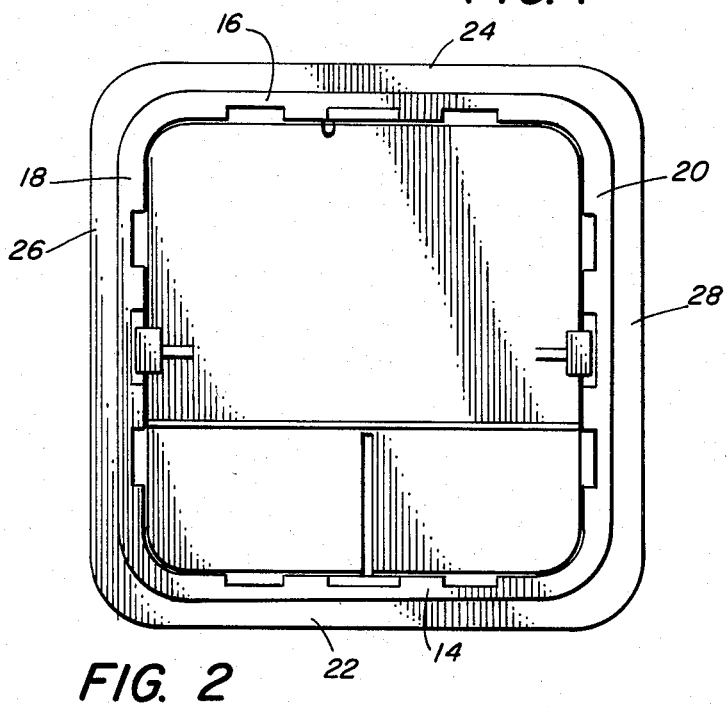
FIG. 2 is a bottom plan view thereof.

Referring to the drawings and specifically to FIG. 1, it will be seen that the illustrative cable bushing 10 includes a frame portion 12, and a filler portion 13 disposed on the frame portion 12. As can be seen in FIG. 2 which is a bottom plan view, the frame portion 12 has a front wall 14 and a back wall 16 interconnected by side walls 18, 20. Each of the walls 14, 16, 18, 20 is provided with a flange portion 22, 24, 26, 28, respectively, along one edge thereof, the flange portions extending outwardly from the walls 14, 16, 18, 20, respectively.

Figure 3:
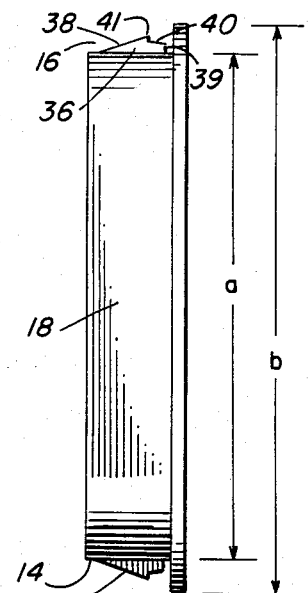
FIG. 3 is a side elevational view thereof, the side not shown being a mirror image thereof.
Figure 4:
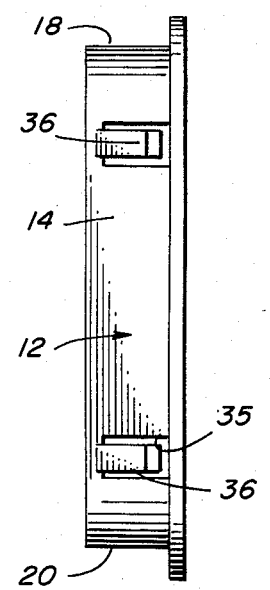
FIG. 4 is a front elevational view thereof, the rear view not shown being a mirror image thereof.

With reference to FIGS. 3 and 4, each of the front wall 14 and back wall 16 is provided with at least one U-shaped slot 35 (two are shown) which demarcates three sides of a tab 36. The outer side of each tab 36 projects from the remainder of the associated wall 14 or 16 and is characterized (see FIG. 3) by an element 38 inclined from the walls 18 or 20, a second element 39 generally normal to the associated wall 14 or 16, and a third element 40 generally parallel to the associated wall 14 or 16 and connecting the other two elements 38 and 39. A lip 41 is disposed at the juncture of elements 38 and 40. Each tab can be flexed relative to the remainder of the associated wall 14 or 16.

Figure 11:
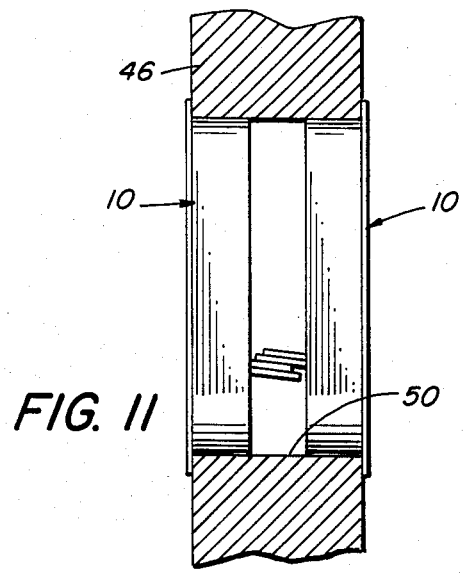
Figure 10:
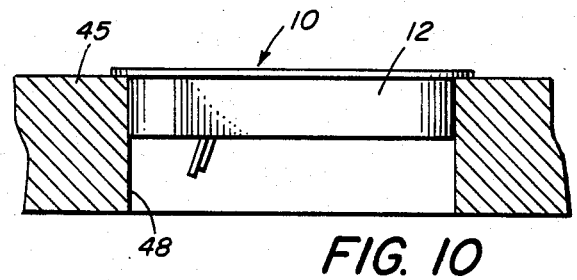
FIG. 10 is a side elevational view of a bushing made in accordance with an embodiment of this invention disposed in a desk top or wall structure; and, FIG. 11 is a side elevational view of two bushings, each made in accordance with an embodiment of this invention, disposed back-to-back within a wall partition structure.
Figure 12:
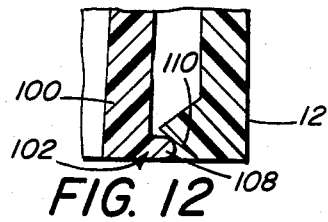
FIG. 12 is an enlarged view of the circled area designated "X" in FIG. 9.

It will be understood with the aid of FIGS. 10 and 11 in conjunction with the above description that the flange portions 22, 24, 26, and 28 are intended to engage an exposed side 42 or 44 of a respective desk top 45 (FIG. 10) or wall or partition 46 (FIG. 11) to secure the frame portion 12 of the bushing 10 in a hole 48 or 50, respectively, in the associated desk top 45 or partition 46. The hole 48 or 50 is configured and sized so as to permit the receipt of the filler portion 13 therein, preferably with a snug fit. Tab 36 (See FIGS. 3 and 4) serves as a detent and provides additional frictional fit between the desk top 45 or the partition 46 and the frame portion 12. The tab 36 acts as a cantilevered spring which can positively engage the desk top 45 or partition 46 when the associated hole 48 or 50 has a width greater than "a" but less than "b" (see FIG. 3). Lip 41 serves to increase the frictional engagement.

Alternatively, in those applications in which the desk top 45 or partition 46 is relatively thin or includes a veneer (not shown), its thickness (or that of the veneer) may be disposed between the respective flange 26 or 28 and surface 39 or lip 41 as the case may be. The frame portion 12 is inserted within the hole 48 or 50. Tab 36 flexes inwardly toward the associated wall 14 or 16 as the desk top 45 or partition 46 passes, and thereafter snaps back with either surface 39 or lip 41 underneath the desk top 45 or partition 46, depending on its material thickness, so as to lock the cable bushing 10 in place. Removal of the cable bushing 10 can thereafter be accomplished by once again flexing the tabs 36 while pulling the frame portion from the hole 48 or 50.

Figure 5:
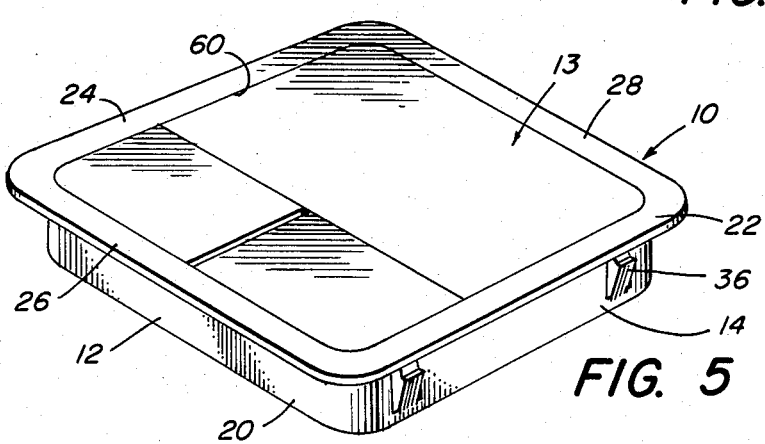
FIG. 5 is a perspective view thereof but with the filler portion rotated 90° relative to the frame portion.

FIG. 5 is perspective view of a cable bushing 10 made in accordance with the invention as hereinabove described. The frame portion 12 comprising the front wall 14 including tabs 36 and the side wall 20 can all be readily seen. These walls 14 and 20, as well as walls 16 and 18 (not shown in this figure) depend and extend away from their respective flanges 22, 28, 24 and 26. The filler portion 13 is a substantially flat or planar sheet disposed between the flanges 22, 24, 26 and 28 in a hole 60 defined thereby. The filler portion 13 has a circumference contoured and sized to be receivable within the hole 60. The geometry and function of the filler portion 13 shall be more fully understood with reference to the following detailed description of FIGS. 6 through 9 and FIG. 12.

Figure 6:
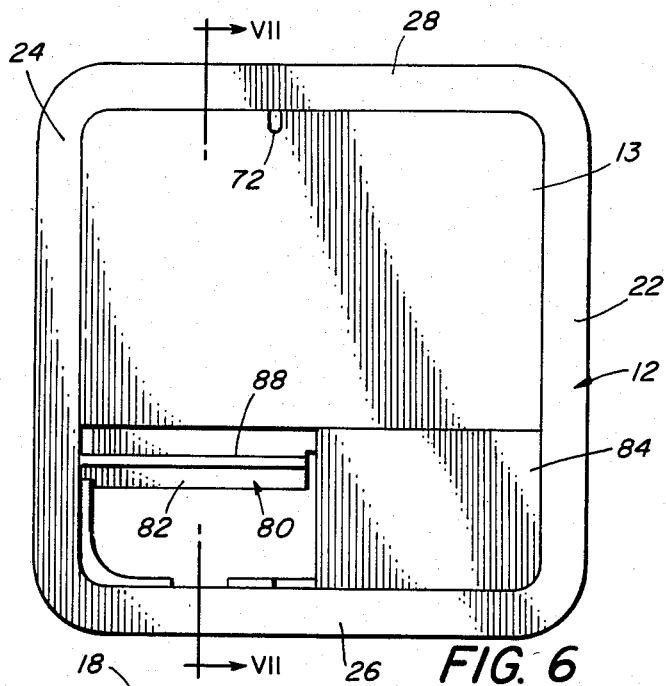
FIG. 6 is a top plan view, similar to FIG. 1, but showing a flap of the bushing in an alternative position and the filler portion rotated 90° relative to the frame portion.
Figure 7:
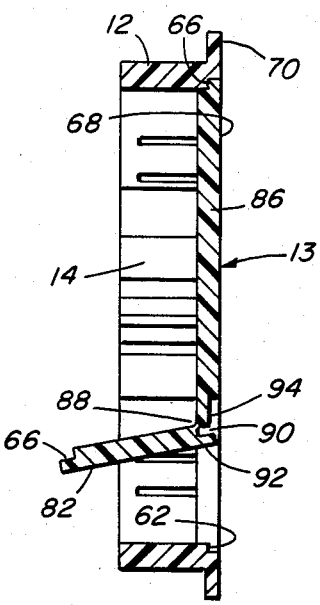
FIG. 7 is a sectional view taken along line VII—VII of FIG. 6.

FIG. 7 is a sectional view taken along line VII—VII of FIG. 6. As can be seen in this figure the filler portion 13, which preferably is molded of plastic as is the frame portion 12, is disposable between the flanges 22, 24, 26 and 28 as just described and as such rests upon a ledge 62 formed by the association of the flanges 22, 24, 26 or 28 and the associated wall 14, 16, 18 or 20. If desired the ledge 62 can be formed by thickening the walls 14, 16, 18 and 20 near each of the corners 63a through 63d (see FIG. 8).

Figure 8:
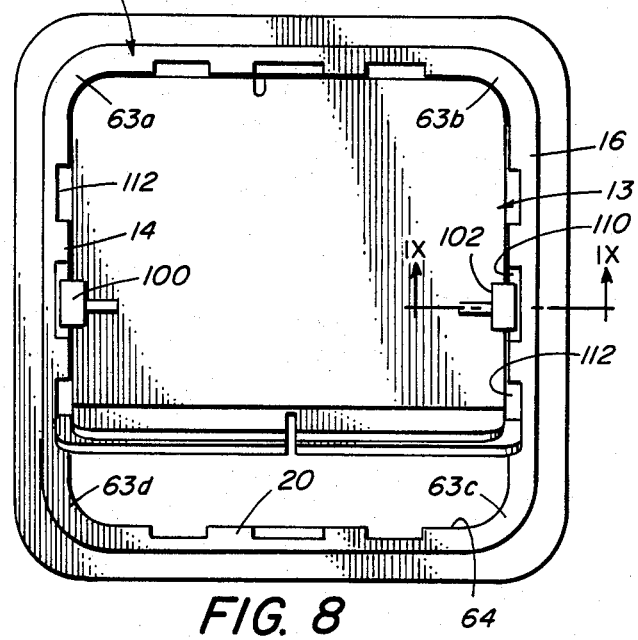
FIG. 8 is a bottom plan view, similar to FIG. 6, but showing a second flap of the bushing also in an alternative position.
Figure 9:
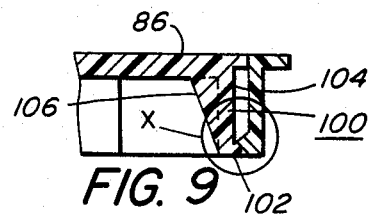
FIG. 9 is a sectional view taken along line IX—IX of FIG. 8.

From FIG. 7, taken in conjunction with FIG. 8, it should be apparent that the opening 64 defined between the spaced side walls 14, 16, 18 and 20 is substantially square (albeit with rounded corners 63a-63d) and approximately equal to but smaller than the size of the hole 60. To be more precise, the opening 64 is smaller than the hole 60 by, for example, the lengths of the ledge 62 associated with both sides 18 and 20. The filler portion 13 is provided with a ledge 66 which mates with the ledge 62 in a butt joint, and thereby provides a snug fit between the filler portion 13 and the frame portion 12. This arrangement enables the filler portion 13 to be disposed in such manner as to have a top surface 68 substantially coplanar with the top surface 70 of the frame portion 12 and supported thereby.

Returning to FIG. 6, it can be seen that the filler portion 13 is provided with a plurality of structures which shall be herein described. The filler portion includes a lifter hole 72 sized so that a pencil or other instrument of small diameter can be used to pry the filler portion 13 from the frame portion 12. The filler portion 13 also includes opening means 80 which permits the filler portion to be opened or otherwise moved so as to permit a cable to be placed therethrough without actual removal of the entire filler portion 13. As shown, the opening means includes two flaps 82 and 84, although any member of such flaps as here described are within the purview of the invention. In FIG. 6, flap 82 is shown in an open position and 84 in its closed position, while in FIG. 8 both flaps 82 and 84 are shown in their open positions.

As can be seen in FIG. 7, the flaps 82 and 84 are pivotally connected to a body portion 86 of the filler portion 13. This can for example be achieved through the use of what is commonly known as a "living hinge", i.e., the molding of the flap 82 or 84 integrally with the body portion 86 with a hinge 88 therebetween comprising an easily bendible web or membrane 90 of plastic. In addition to the web 90, the hinge comprises an extension 92 on the flap 82 which overlaps the membrane 90 and an extension 94 on the body 86 when the body 86 and flap 82 are coplanar thereby forming a butt joint. This provides for increased load carrying ability when a load is applied orthogonal to said top surface 68 of the bushing 10. This is desirable when, for example, the bushing is disposed in a desk top 45 on which may be disposed calculating machines or other items (not shown).

Returning to FIG. 8 it will be appreciated that the flaps 82 and 84 are capable of operating independently from one another so as to permit, for example, one cable to go through the cable bushing 10 via the opening of a single flap 82 or 84, or two or more cables or a cable ribbon to go through via the opening of both or via the removal of the filler portion 13 from the frame portion 12.

FIG. 8 also shows another feature of the filler portion 13, namely the holding means 100. The holding means 100 secures the detachable filler portion 13 to the frame portion 12. It includes a head 102, a stem 104 (see FIG. 9) which connects the head 102 to the body portion 86 of the filler means 13, and a strengthening rib 106 which extends transversely of the stem 104 and it is shaped as a triangle with its apex nearest the head 102 and its base along the body portion 86. The strengthening rib 106 provides the holding means 100 with substantial rigidity, and limits its ability to bend. However, as best can be seen with reference to FIG. 12, the head 102 includes a projecting lip 108 which extends outwardly towards the frame portion 12 when the filler portion 13 is assembled therewith. After assembly the lip 108 extends over a mating surface 110 of the frame portion (see also FIG. 8). Thus it can be appreciated that the holding means 100 prevents accidental dislodging of the filler portion 13 from the frame portion 12. As shown in the drawings, the illustrative cable bushing 10 is shown as having two holding means 100 diametrically opposite to one another on the filler portion 13. Associated with each is a mating surface 110.

It should be apparent from the drawings and from the discussion hereinabove that the filler portion 13 can either be detachable as described, or alternatively can be hingedly connected to the filler portion 12 as by, for example, a "living hinge" as described above though not specifically shown in the drawings.

In the embodiment as shown, the detachable filler portion 13 can be placed on the frame portion 12 in various orientations. In other words the flaps 82 and 84 can be disposed adjacent to any of the four walls 14, 16, 18 and 20. In order to accommodate the various rotated orientations possible, the filler portion 12 is provided with a mating surface 110 along each of the walls 14, 16, 18 and 20. As shown the mating surface is of short length relative to the length of, and located approximately midway along the associated side 14, 16, 18 or 20.

As shown in FIG. 8, an optional feature of restraining means 112 has been provided. The restraining means 112 is a groove or U-shaped channel cut within the wall 14, 16, 18 or 20. As can be seen in FIG. 8, each restraining means 112 is capable of securing or otherwise restraining a flap 82 or 84 in its open position, by holding it with a loose fit along one of its edges. Thus, the restraining means 112 acts in cooperation with a flap 82 or 84 to maintain the integrity of the opening provided through the cable bushing 10 by the flap 82 or 84 being in its open position.

To accommodate rotation of the filler portion 13 relative to the frame portion 12 the restraining means 112 are located on each side of each mating surface 100 of the walls 14, 16, 18 and 20 as shown. However, it should be understood that if the rotation of the filler portion need not be accommodated, only one restraining means 112 for each flap 82 or 84 need be provided. Thus it will be appreciated that the frame portion 12 as shown in FIG. 8 is substantially symmetrical.

In use, frame portion 12 is inserted within a hole 48 or 50 in a desk top 45 or partition 46. It has been found that a useful size for the bushing 10 is approximately 2.2 inches square. The walls 14, 6, 18 and 20 are slid into a similarly sized hole 48 or 50 until the inclined elements 38 of the tabs 36 encounter the desk top 45 or partition 46. Additional pressure applied to the bushing 10 causes the tabs 36 to deform slightly so as to allow each to ride past the edge of the hole 48 or 50, thereby snapping into place and frictionally engaging the hole 48 or 50. The filler portion 13 is then placed on the frame portion 12 with the flaps 82 and 84 in their desired position. Downward pressure upon the body 86 of the filler portion 13, for example, with the flap 82 or 84 riding within the restraining means 112 assembles the bushing 10 with a snap of the holding means' head 102 over the mating surface 110.

Where two such cable bushings 10 are used back-to-back, as in FIG. 11, the flap 82 or 84 of each can be in its open position, with an aligned passage through the bushing 10. For example, flap 82 of one bushing 10 and flap 84 of the other can be both open so as to achieve the aligned passage. In any case, if the bushings are sufficiently close, preferably the restraining means 112 of one bushing can accommodate and restrain the open flaps 82 and 84 of the other bushing 10. This requires, for example, that the restraining means be of sufficient length to accommodate therein its associated flaps 82 or 84 along with that of the other bushing.

Thus it can be readily understood that the walls 14, 16, 18 and 20 of the bushing 10 protect the cable from cutting and chafing actions of the desk top 45 or partition 46 hole edge. Further, the filler portion 13 to a large extent fills the space between the cable and the bushing 10 impeding flow of dust through said base, and providing a solid, flat surface similar to the surface of the desk top 45 or partition 46.

It is to be understood that the present invention is by no means limited to the particular construction herein disclosed and/or shown in the drawings, but also comprises any modifications or equivalents within the scope of the disclosure. For example, the filler portion 13 may be of other materials and/or configurations affording the desired objectives and may be attached to the frame portion pivotally or by side rails and tracks. Further, it can be readily understood that the filler portion 13 could be a round configuration, and, for example, the flaps 82 and 84 could be of crescent or semi-circular shape. Likewise, any number of flaps along the perimeter of the filler portion 13, or centrally located in the middle of the filler portion 13, can be anticipated by this invention.

We claim:

1. A cable bushing comprising a frame portion, and a filler portion, said filler portion being disposable on said frame portion and including a body portion, and at least one flap hingedly connected to said body portion, said flap movable to a first position in which it is coplanar with the body portion and a second position in which the flap is disposed within said frame portion thereby providing an opening therethrough, said frame portion being adapted to occupy an opening in a structure and being further adapted to receive a cable therethrough.

2. The invention in accordance with claim 1 in which said filler portion is detachable from said frame portion.

3. The invention in accordance with claim 1 in which the flap is connected to the body of the filler portion by a living hinge.

4. The invention in accordance with claim 1 or 3 in which said frame portion includes four walls and said filler portion is capable of interconnecting said four walls along one edge thereof.

5. The invention in accordance with claim 1 wherein the frame portion further comprises a detent for engaging said structure and holding the cable bushing within the opening therein.

6. The invention in accordance with claim 1 in which the filler portion further comprises means for holding it securely to the frame portion.

7. The invention in accordance with claim 4 in which a portion of said walls are provided with means for securing said walls in said partition structural opening.

8. The invention in accordance with claim 7 in which said securing means comprise integrally molded tabs extended outwardly from said walls.

9. The invention in accordance with claim 1 further comprising means for restraining the flap in its open position.

10. The invention in accordance with claim 1 wherein the frame portion is of a box-like construction open at two opposing ends, and the filler portion is substantially square and capable of closing said frame portion at one of its ends.

11. The invention in accordance with claim 1 wherein the opening is defined between the filler portion and the frame portion.

12. The invention in accordance with claim 1 taken in combination with a desk top having a bore therethrough, the cable bushing being disposed within said bore, and said filler portion capable of substantially closing said bore when in its first position.

13. The invention in accordance with claim 4 in which said filler portion is disposed on a ledge defined by said walls, and said living hinge includes a butt joint formed by the adjacent edges of the body portion and the flap.

14. The invention in accordance with claim 1 having at least two flaps disposed next to one another along one of said walls and each flap capable of pivotal movement relative to the body portion and independent of the movement of the other flap.

15. An assembly comprising a partition including spaced coplanar walls and having a bore therethrough, a first cable bushing disposed along a first of said walls and within said bore, and a second cable bushing along a second of said walls and within said bore, said first and second cable bushing having therein aligned openings, wherein each of said first and second cable bushings comprises a frame portion and a filler portion capable of substantially closing the opening defined by said frame portion, said filler portion comprising a body portion and at least one flap coplanar with and hingedly mounted to said body portion and capable of pivotal movement relative thereto to a position in which it is not coplanar with the body portion, said body portion being substantially coplanar with its associated partition wall.

* * * * *